United States Patent [19]

Frank et al.

[11] Patent Number: 4,594,614

[45] Date of Patent: Jun. 10, 1986

[54] FILM VIDEO PLAYER WITH ELECTRONIC STROBE LIGHT

[75] Inventors: Lee F. Frank, Rochester, N.Y.; Donald F. Kaiser, Parsippany, N.J.

[73] Assignee: Eastman Kodak Company, Rochester, N.Y.

[21] Appl. No.: 596,868

[22] Filed: Apr. 4, 1984

[51] Int. Cl.[4] .............................................. H04N 3/14
[52] U.S. Cl. ................................ 358/214; 354/145.1
[58] Field of Search .................... 358/214, 211, 228; 354/62, 415, 145.1; 362/32, 311, 355

[56] References Cited

U.S. PATENT DOCUMENTS

| | | | |
|---|---|---|---|
| 3,846,811 | 11/1974 | Nakamura et al. | 354/145 |
| 4,151,560 | 4/1979 | Zinchuk | 358/214 |
| 4,255,764 | 3/1981 | Howe | 358/214 |
| 4,274,131 | 6/1981 | Praamsma | 362/355 |

*Primary Examiner*—Gene Z. Rubinson
*Assistant Examiner*—Stephen Brinich
*Attorney, Agent, or Firm*—Thomas H. Close

[57] ABSTRACT

A film video player for producing a standard television signal from photographic film includes an image sensor for sensing a film image illuminated by a pulse of light from an electronic strobe light. The electronic strobe light includes a high voltage power supply with a voltage greater than the minimum ignition voltage of a flash tube in the strobe light for igniting an arc in the flash tube, a low voltage power supply having a voltage less than the minimum ignition voltage of the flash tube for producing an extended pulse of light of constant intensity, means including a photocell for sensing the quantity of light produced by the flash tube and including a control device in series with the flash tube for terminating the pulse of light after a predetermined quantity of light is produced, and means for dispersing the light from the flash tube to produce more uniform illumination. The film video player has the advantage of providing a video signal free from visible flicker, of uniform intensity, and constant color balance. A further advantage is that the video player generates very little heat from its electronic strobe light source and therefore requires minimal cooling.

4 Claims, 7 Drawing Figures

FILM VIDEO PLAYER WITH ELECTRONIC STROBE LIGHT

TECHNICAL FIELD

The present invention relates to improvements in a film video player for producing a standard television signal from photographic film, and more particularly to such a film video player having an image sensor for sensing a film image that is illuminated by an electronic strobe light.

BACKGROUND ART

A film video player for the television display of color images recorded on color negative photographic film has been publicly demonstrated. The film video player, described in pending U.S. application Ser. No. 426,426, filed Sept. 29, 1982 by L. G. Moore and T. H. Lee, and in corresponding PCT International Application U.S. 83/01416 filed Sept. 19, 1983, includes a large CCD image sensor of the type in which photosignals are generated directly in the transfer channels of the CCD. No light shielded frame storage array is provided on the image sensor so that the entire area of the image sensor can be employed to sense light, thus maximizing the resolution and light collecting capacity of the sensor. The image sensor is illuminated by a pulsed light source during the vertical retrace interval of a standard television signal, and then read out in the dark to avoid smearing the image signal generated by the image sensor. The pulsed light source in the film video player that was demonstrated to the public comprised a quartz halogen projection lamp, the light output from which was chopped by a spinning shutter disc. Although the light source produced a very adequate illumination with excellent pulse-to-pulse uniformity and constant color temperature, the chopped light source was mechanically complex and consumed a considerable amount of energy, requiring substantial cooling.

In the above mentioned patent application, it is noted that alternatively, the pulsed light source may comprise an electronic strobe light such as a Xenon flash lamp synchronized to the vertical retrace interval of the television signal. The film video player with an electronic strobe light would provide several advantages over a film video player with a quartz halogen projection lamp with a mechanical shutter. Namely, the electronic strobe lamp would provide reduced mechanical complexity and lower power consumption, resulting in reduced heat generation and consequently, reduced cooling requirements.

It has been found however, that a film video player of the type described above having a conventional electronic strobe light as the pulsed light source, produces a television signal that evidences an annoying flicker. A number of flash tubes were tested in a conventional stobe light circuit and it was found that the average flash-to-flash variation in light output was on the order of one stop (0.3 log E). The most stable of the flash tubes tested produced a variation of approximately 0.1 stop of exposure variation flash-to-flash. The use of these flash tubes in the film video player resulted in a very visible flicker on the television display. A conventional flash quench circuit with a closed loop servo for measuring the light output and quenching the flash when the output reached a determined value was found to reduce the measured flicker to approximately 0.02 to 0.05 stops of exposure from flash-to-flash. This level of flash-to-flash variation was still noticeable on a television display of still pictures. When the amount of light output is changed with this type of flash circuit, the color temperature of the light shifts, causing an unwanted color change in the video display.

DISCLOSURE OF THE INVENTION

It is an object of the present invention to provide a film video player of the type having an image sensor for sensing a film image that is illuminated by an electronic stobe light, that produces a signal free from visible flicker. It is a further object to provide such a film video player having an electronic strobe light that is energy efficient so as to generate a minimum of heat, and that exhibits a constant color temperature when the amount of light output is changed.

It is a still further object of the invention to provide an electronic strobe light having a long useful lifetime in the film video player apparatus.

A still further object of the invention is to provide a film video player having an electronic strobe light with a flash-to-flash light output variation of less than 0.02 stops standard deviation.

The objects are achieved according to the present invention by providing a film video player having an electronic strobe light with: (1) a high voltage power supply having a voltage greater than the minimum ignition voltage of a flash tube in the electronic strobe light, for igniting an arc in the flash tube; (2) a low voltage power supply having a voltage less than the minimum ignition voltage for producing an extended pulse of light of constant intensity from the flash tube; means including a photocell for sensing the quantity of light from the flash tube and including a control device in series with the flash tube for terminating the pulse of light after a determined quantity of light is produced; and means for dispersing the light from the flash tube to produce more uniform illumination.

BRIEF DESCRIPTION OF THE DRAWINGS

In describing ways of carrying out the invention, reference is made to the drawings, wherein.

WAYS OF CARRYING OUT THE INVENTION

Figure 1:
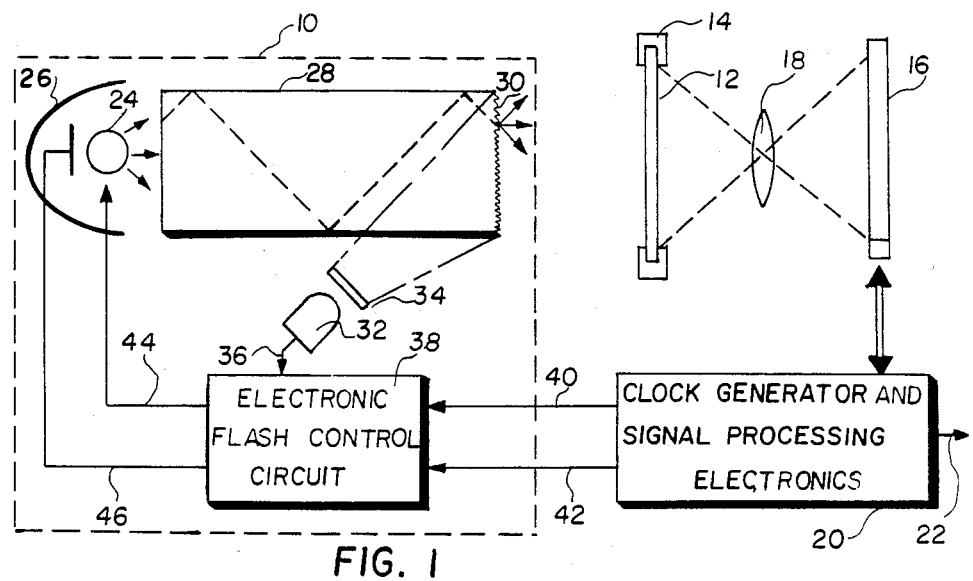
FIG. 1 is a schematic diagram of a film video player having an electronic strobe light according to the present invention.

FIG. 1 shows a film video player having an electronic strobe light according to the present invention. The film video player includes an electronic strobe light generally designated 10, for illuminating a photographic film 12, in a film gate 14. An image of the illuminated film 12 is projected on a solid state image sensor 16 by a projection lens 18. The solid state image sensor 16 is controlled by, and its output signals are processed by, clock generator and signal processing electronics 20 to produce a video signal at the output line 22 in a conventional manner.

The solid state image sensor 16 is a CCD image sensor of the type wherein photosignals are generated directly in the charge transfer registers. To maximize the area of the sensor available for photosensing, no light shielded frame storage area is provided on the sensor, thereby requiring that the sensor be flashed exposed and read out in the dark. The image sensor 16 is exposed by the strobe light 10 during the vertical retrace intervals of the standard video signal, and is read out in the dark at the standard video rate.

As shown in FIG. 1, the electronic strobe light 10 includes a flash tube 24, such as a Xenon flash tube; a reflector 26; light dispersing means including a light integrator 28, such as a solid bar of transparent material, or a box having reflective internal walls, and a light diffuser 30 such as an opal glass at the end of the light integrator, or in the case where the light integrator is a solid transparent bar, a frosted surface at the end of the bar opposite the flash tube; a photosensor 32, such as a photodiode, with a spectral filter 34 to match the spectral response of the photosensor 32 to the spectral response of the image sensor 16 for producing a photosignal on line 36 representing the intensity of light from the flash tube; and an electronic strobe flash control circuit 38. The electronic strobe flash control circuit 38 receives a video synchronization signal on line 40 and an exposure control signal on line 42 from the clock generator and signal processing electronics 20 and supplies lamp power on line 44 and a trigger pulse on line 46 to the flash tube 24. The exposure control signal is a reference level signal representing a desired light output from the flash tube. The exposure control signal is generated for example, by comparing the average of the output signal from the image sensor 16 with a selected reference value to generate the exposure control signal.

Figure 2:
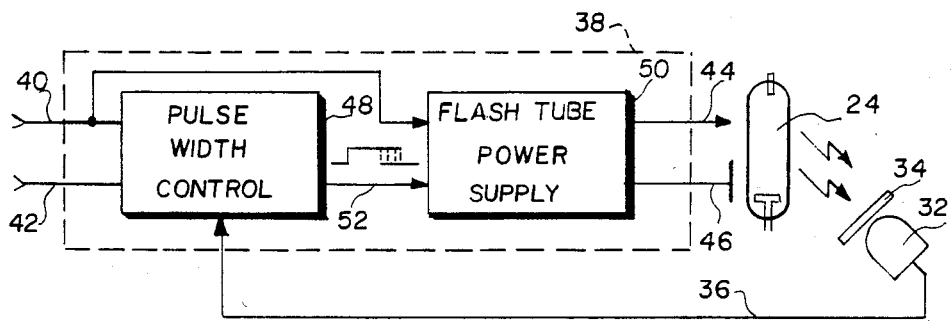
FIG. 2 is a block diagram of the control circuit for the electronic strobe light.

As shown in FIG. 2, the electronic flash control circuit 38 includes a pulse width control circuit 48 and a flash tube power supply 50. The pulse width control circuit 48 receives the video synchronization signal on line 40, the exposure control signal on line 42, and the photosignal from the photosensor 32 on line 36, to produce a flash control signal on line 52. The flash tube power supply 50 receives the video synchronization signal on line 40 and the flash control signal on line 52 and provides the lamp power and trigger pulse to the flash tube 24 on lines 44 and 46 respectively.

Figure 3:
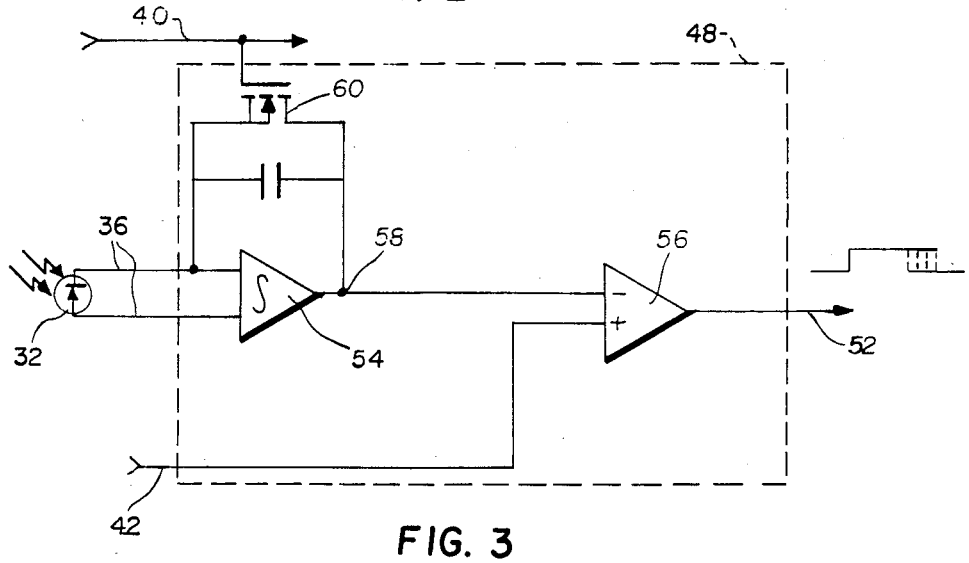
FIG. 3 is a circuit diagram of the pulse width control portion of the electronic strobe flash control circuit.

As shown in FIG. 3, the pulse width control circuit 48 includes an integrator 54 and a comparator 56. The integrator 54 receives the photosignal from photosensor 32 and produces an integrated signal on output terminal 58 representing the total quantity of light reaching the photosensor. The output of the integrator 54 is reset to zero when the video synchronization signal on line 40 is applied to the gate of a reset FET 60. Comparator 56 receives as inputs, the exposure control signal on line 42, and the integrated light signal on line 58, and produces a flash control signal on line 52 that is high whenever the integrated light signal is less than the exposure control signal, and is low when the integrated light signal is greater than the exposure control signal.

Figure 4:
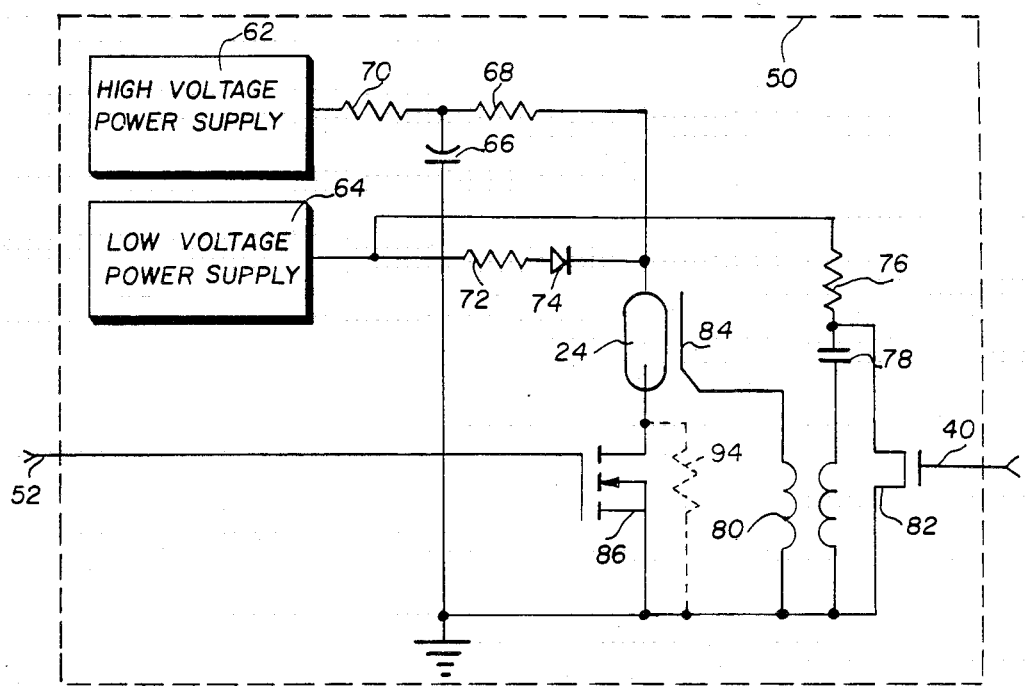
FIG. 4 is a circuit diagram of the flash tube power supply portion of the electronic strobe flash control circuit.

As shown in FIG. 4, the flash tube power supply 50 includes a high voltage power supply 62, having a voltage higher than the minimum ignition voltage of the flash tube 24, and a low voltage power supply 64 having a voltage lower than the minimum ignition voltage of the flash tube 24. The high voltage power from the high voltage power supply 62 is applied to the flash tube 24 from a relatively small capacitor 66 through a low value resistor 68. The capacitor 66 is charged from the high voltage power supply 62 through a high value resistor 70.

The low voltage power from the low voltage power supply 64 is applied directly to the flash tube 24 through a low value resistor 72 in series with a diode 74. The low voltage from the low voltage power supply 64 is also applied, through a high value resistor 76 to a trigger capacitor 78. The trigger capacitor 78 is connected in series with the input coil of a trigger transformer 80. An FET transistor 82 is connected between resistor 76 and capacitor 78 to ground. The video synchronization signal on line 40 is applied to the base of the FET transistor 82. The output coil of the trigger transformer 80 is connected to a flash trigger electrode 84.

The flash tube 24 is connected to ground through a power FET 86. The flash control signal on line 52 is applied to the base of power FET 86.

The operation of the film video player with the electronic strobe light will now be described.

During readout of the image sensor 16, the flash control signal applied to the base of power FET 86 on line 52 by the pulse width control circuit 48 is low, thereby turning off power FET 86 and preventing light output from flash tube 24. Capacitors 66 and 78 are charged through resistors 70 and 76 respectively during this period. At the end of the readout of a video field, during the vertical retrace interval of the standard video signal, clock generator and signal processing electronics 20 produces a video synchronization pulse on line 40. The video synchronization pulse on line 40 is applied to the base of reset FET 60 (see FIG. 3) to reset the output of integrator 54 to zero. When the integrated light signal on line 58 falls below the exposure control signal on line 42, the flash control signal generated by comparator 56 is caused to go high. Power FET 86 is turned on by the flash control signal going high, thereby enabling the flash tube to fire.

Figure 5:
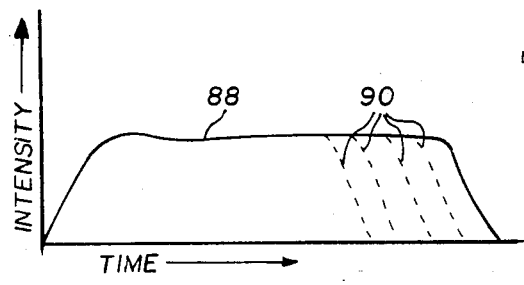
FIG. 5 is a plot of light intensity versus time, useful in explaining the operation of the electronic strobe light.

The video synchronization signal (after undergoing a suitable delay, not shown) is also applied to the base of FET 82, turning on FET 82 and causing capacitor 78 to discharge through the input coil of trigger transformer 80. In response, a very high trigger voltage is momentarily generated in the output coil of trigger transformer 80. The trigger voltage is applied to the trigger electrode 84 of flash tube 24, thereby momentarily partially ionizing the gas in the flash tube 24. The partial ionization allows an arc to be formed in the flash tube by the discharge of capacitor 66 through the tube 24. As capacitor 66 discharges through the flash tube 24, the voltage across the capacitor drops until it is equal to the voltage produced by the low voltage power supply 64. At this time, the low voltage power supply 64 takes over and supplies the power to maintain the light output from the flash tube 24 at a steady intensity. The value of capacitor 66 is chosen to be sufficiently low such that the peak intensity of light produced by its discharge will not exceed the constant intensity of light produced by low voltage power supply 64. The plot of light intensity versus time labelled 88 in FIG. 5, illustrates this operation. The phantom lines labelled 90 indicate that the light output is terminated at variable times by the feedback circuit including photosensor 32. By maintaining the intensity constant throughout the light pulse, the color temperature of the light source is not affected when the length of the pulse is changed.

The light emitted from the flash tube 24 undergoes multiple internal reflections in the light integrator 28, and is dispersed by the light diffuser 30 to improve the brightness uniformity of the light across the field of illumination. The exact form of the light dispersing means is not critical.

As shown in FIG. 1, photosensor 32 monitors the light that is reflected back from the frosted surface 30 of the light integrating bar 28. The exact location of photosensor 32 has not been found to be critical. For example, the sensor can be located on the other side of diffuser 30 with equally good effect. As the photosignal on line 36 is integrated by integrator 54, the output of the integrator on line 58 steadily rises until it is equal to the exposure control signal on line 42. At this point, the flash control signal generated by comparator 56 on line 52 goes low.

When the flash control signal on line 52 goes low, power FET 86 is turned off, thereby extinguishing the light output from the flash tube 24. This sequence is repeated during each vertical retrace interval of the standard television signal.

By igniting the arc with a short, high voltage pulse above the minimum ignition voltage of the flash tube, and maintaining the arc with a voltage lower than the minimum ignition voltage of the flash tube 24, energy efficient operation of the flash tube is achieved, and control of the flash tube with a power transistor is enabled. By measuring the actual output of the flash tube and terminating the output with a power transistor, the flash-to-flash intensity variations from the light source are greatly reduced.

Figure 6A:
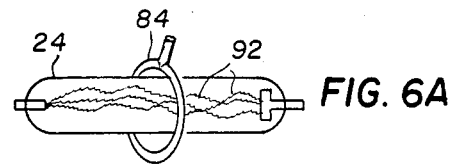
FIGS. 6A and 6B are schematic diagrams of a flash tube useful in describing the preferred trigger electrode configuration of the flash tube.

Along with flash-to-flash intensity variations, another source of flicker in the image with a conventional strobe light source is flash-to-flash variations in the arc path within the flash tube 24, thereby causing an apparent motion of the light source from flash-to-flash. FIG. 6A schematically illustrates this phenomenon by various arc paths labelled 92, in a flash tube 24 having a conventional trigger electrode 84 comprising a loop of wire around the outside of the tube. The use of the light integrator 28 and the light diffuser 30 reduce the visibility of this phenomenon.

Figure 6B:
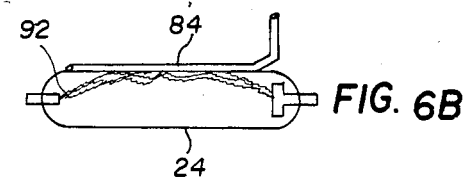

Further improvement in light output uniformity across the field is achieved by employing a trigger electrode of the type comprising a long conductor in contact with the side of the tube and lying parallel to the long axis of the tube. FIG. 6B illustrates this type of trigger electrode 84. The various arc paths 92 shown in FIG. 6B illustrate how the arc is confined to a smaller region in the tube by the use of such a trigger electrode.

In an alternative mode of operation, the arc in the flash tube is not completely quenched after each flash. Rather, the light output from the flash tube is reduced during readout of the image sensor to a level below that which causes objectionable smear in the image sensor during readout of the image sensor. The light output is then increased to the desired exposure level during the vertical retrace interval. This operation is achieved by inserting a bypass resistor 94 (shown in phantom in FIG. 4) of appropriate valve (e.g. 2kΩ) in parallel with power FET 86. The bypass resistor allows the flash tube to simmer at a low light output level when power FET 86 is turned off. In this mode of operation, the pulses of very high voltage applied to trigger electrode 84 are interrupted (by means not shown) after the flash tube is first ignited, thereby reducing the level of electromagnetic interference generated by the circuit.

A video player having an electronic strobe light according to the present invention, was constructed as follows. A 9 mm long Xenon flash tube having a minimum ignition voltage of approximately 180 volts was employed for flash tube 24. High voltage power supply 62 was 300 volts, and low voltage power supply 64 was 100 volts. Capacitor 66 was 0.068 $\mu$f, the resistors were as follows: 70–100k $\Omega$, 68–15 $\Omega$, 72–10 $\Omega$. FET transistor 86 was a 100 volt 10 amp VMOS FET. The trigger voltage applied to trigger electrode 84 was approximately 2000 volts. Other components of the apparatus were standard components selected for their suitability from known components in the art.

At moderate light outputs of 0.05 joules per flash, the flash tube 24 was capable of operating in excess of 100 million flashes. The standard deviation of the flash-to-flash output was reduced to 0.005 stop, a level that produces no visible flicker in the image produced by the film video player. There was no noticeable color change when the exposure control signal was varied to produce a lighter or darker output from the film video player. The electronic strobe light operated efficiently with minimal cooling required.

Although specific values for components of the flash lamp have been described, it will be recognized by those skilled in the art that the values of the voltages and components will depend upon the particular flash tube employed, and especially upon the length of the flash tube, longer flash tubes requiring generally higher voltages.

INDUSTRIAL APPLICABILITY

A film video player having an image sensor that is flash illuminated by an electronic strobe light has been described. The film video player is useful as a product, for example, in the home entertainment or educational fields. The film video player has the advantages that the images produced are free from visible flicker, the color balance remains constant throughout the output range of the electronic strobe light source, the electronic strobe light source is energy efficient, requiring a minimum of cooling, and possesses a long life.

We claim:

1. A film video player for producing a standard television signal from color negative photographic film, comprising:

an area array image sensor for sensing a flash illuminated image of the photographic film during a vertical retrace interval to produce the standard television signal;

an electronic strobe light for flash illuminating the photographic film to produce the flash illuminated image, the electronic strobe light including an elongated flash tube and an elongated trigger electrode extending along the length of the flash tube;

means for dispersing the light from the flash tube for producing more uniform illumination;

a high voltage power supply for providing a voltage greater than the minimum ignition voltage of the flash tube for igniting an arc in the flash tube, and a low voltage power supply for providing a voltage less than the minimum ignition voltage for producing an extended pulse of light of constant intensity from the flash tube; and flash control means for controlling the flash-to-flash light output variations to less than 0.02 stops standard deviation to thereby eliminate flicker in the television signal, including;

photosensing means including a photodiode and operational amplifier means for sensing the light output of said flash tube and producing a control signal in response to a predetermined quantity of light being produced, said photodiode being located to sense the dispersed light produced by said light dispersing means, and solid state switch means comprising a power FET in series with the flash tube, and responsive to said control signal for interrupting the current through said flash tube in response to said control signal.

2. The film video player claimed in claim 1, wherein the means for dispersing the light from the flash tube comprises a light integrating bar arranged with the flash tube on one end and having a frosted surface on an end opposite the flash tube.

3. The film video player claimed in claim 2, wherein the photocell is arranged to sense the light reflected back from the frosted end of the integrating bar.

4. The film video player of claim 1, further comprising a bypass resistor in parallel with the FET transistor.

* * * * *